United States Patent [19]
Miklos et al.
[11] 3,864,754
[45] Feb. 4, 1975

[54] MAGNETIC RECORD MEDIUM HAVING PERMANENT RECORD PATTERN AND INFORMATION PROCESSING SYSTEM USING SAID MEDIUM

[75] Inventors: Richard L. Miklos, Maplewood; Jack E. Blackburn, Oakdale, both of Minn.

[73] Assignee: Minnesota Mining and Manufacturing Company, St Paul, Mich.

[22] Filed: May 2, 1973

[21] Appl. No.: 356,605

[52] U.S. Cl. .................................. 360/131, 360/51
[51] Int. Cl. ........................................... G11b 5/74
[58] Field of Search ............. 179/100.2 A, 100.2 S; 100/2 MD; 340/174.1 A; 360/134, 360/5, 6, 131, 27, 51-56

[56] References Cited

UNITED STATES PATENTS

| | | | |
|---|---|---|---|
| 2,923,589 | 2/1960 | Curtis | 340/174.1 A |
| 3,114,010 | 12/1963 | Wolf et al. | 179/100.2 S |
| 3,200,207 | 8/1965 | Reiner et al. | 179/100.2 S |
| 3,404,392 | 10/1968 | Sordello | 179/100.2 S |
| 3,665,118 | 5/1972 | Cooper, Jr. | 179/100.2 S |

*Primary Examiner*—Vincent P. Canney
*Attorney, Agent, or Firm*—Alexander, Sell, Steldt & DelaHunt

[57] ABSTRACT

A magnetic record medium having a magnetic recording layer containing a uniformly dispersed magnetizable material having magnetic anisotropy, such as gamma-$Fe_2O_3$. The magnetizable material is predominantly physically aligned parallel to an intended direction of movement of the medium, and is physically aligned in a direction transverse to the intended direction at a plurality of selected locations spaced along a track extending in the intended direction to provide a series of spaced, magnetically detectable permanent position/clocking marks. The medium is used in information processing systems providing automatic positioning of predetermined portions of the medium, and automatic positioning and timing of recorded data on the medium.

13 Claims, 5 Drawing Figures

MAGNETIC RECORD MEDIUM HAVING PERMANENT RECORD PATTERN AND INFORMATION PROCESSING SYSTEM USING SAID MEDIUM

CROSS REFERENCE TO RELATED APPLICATION

This application is related to the copending application of the present inventors, entitled, METHOD OF MAKING A MAGNETIC RECORD MEDIUM FOR USE IN INFORMATION PROCESSING SYSTEMS, Ser. No. 356,604 to the application of Richard E. Fayling, entitled, MAGNETIC RECORD MEDIUM AUTHENTICATION SYSTEM, Ser. No. 356,602 and to the application of Richard E. Fayling and Douglas D. Campbell entitled, MAGNETIC SECURITY DOCUMENT AND METHOD FOR MAKING SAME, Ser. No. 356,603 all of which applications were filed on May 2, 1973 and are assigned to the same assignee as this application.

BACKGROUND OF THE INVENTION

1. Field of the Invention

This invention pertains to magnetic record media and especially to techniques for interrogating fixed information from such media.

2. Description of the Prior Art

The expanded use of magnetic record media for processing large amounts of magnetically encoded data has created a great need for providing record media with permanent, fixed information patterns to be used for indexing, positioning or timing purposes. Information processing systems using such media include transducers acting on the permanent patterns in order to produce signals representing the fixed information, thereby enabling the location of particular portions of the media and the activation of other control functions as desired.

It is known to provide permanent fixed information patterns in magnetic recording media by affixing conductive metal foil strips at appropriate locations to be sensed by electrical contacts, photocells and the like. Similarly, the media may be perforated at desired locations, whereby the perforations are mechanically or optically sensed.

Magnetic record media which are disclosed in U.S. Pat. Nos. 3,566,356, 3,052,567, 3,219,353 and 3,328,195, contain multiple layers or composites of magnetizable material which are designed to respond to different types of magnetic fields, or to provide easily erased information on one layer and more difficulty erased information on another layer. A particular fixed information pattern, such as position or clocking marks, can be recorded in that portion of the media from which information is more difficultly erased and thereafter sensed to provide signals representing the fixed information as is shown in U.S. Pat. No. 3,404,392 . However, such patterns can be inadvertently erased or altered in the process of conventionally recording other data on the media.

Standard techniques of making magnetic recording media having physically aligned particles include preparing a dispersion of the magnetic particles, knife coating the dispersion onto a smooth substrate and subjecting the resultant coating to a "quietizer" field to thereby physically align the particles along the direction of the field.

SUMMARY OF THE INVENTION

The present invention provides an improved record medium of the general type described in the copending patent applications cross-referenced hereinabove.

Magnetic record media typically contain a layer comprising magnetizable material, such as a uniform dispersion of magnetically anisotropic particles in a non-magnetic binder, in which the magnetizable material is predominantly physically aligned parallel to an intended direction of movement of the medium. In this invention, the magnetizable material at a plurality of selected locations spaced along a track extending in the intended direction of movement of the medium is physically aligned in a direction transverse thereto to provide magnetically detectable permanent position or clocking marks. In a preferred embodiment, the selected locations are uniformly spaced along the track to provide a series of uniformly spaced marks.

The magnetizable material preferably comprises anisotropic particles having associated therewith an easy direction of magnetization. Thus, when the particles are physically aligned and a magnetic field is applied along the easy direction of magnetization, a different, higher level of remanent magnetization is produced than is produced when the same field is impressed along a direction other than the easy direction. Such variations in the remanence allows magnetic detection of the selected locations.

The present invention also provides an information processing system including a record medium such as that described above, in which the magnetizable material positioned at selected locations along a track extending in the intended direction of movement of the medium is physically aligned in a direction transverse thereto to provide a series of magnetically detectable permanent position/clocking marks. A substantially unidirectional magnetic field is applied along the track to differently magnetize the magnetizable material depending upon the direction of physical alignment thereof. The magnetization of the differently magnetized material along the track is sensed to provide signal pulses representative of each of the selected locations. The representative signal pulses are processed to locate predetermined portions of the record medium. In one preferred embodiment the representative signal pulses are counted and compared with a reference signal to locate a predetermined portion of the record medium. The selected locations cannot be inadvertently erased, and thereby enhance the reliability and convenience of systems which reuse such magnetic media and which need a reliable and inexpensive way to locate and keep track of particular recorded information such as may be recorded thereon.

In another preferred embodiment of the information processing system the differently physically aligned selected locations are uniformly spaced along the track to provide a series of uniformly spaced magnetically detectable permanent clocking marks corresponding to a series of data bit locations. The medium is moved along a track and a magnetic field is applied to differently magnetize the material as described hereinabove. The magnetization of the differently magnetized materials along the track is sensed to produce a signal pulse representative of each of the selected locations. The representative signal pulses are then converted into a series of uniformly spaced shaped clocking pulses corresponding to series of data bit locations to enable recording/reproduction of data bits in/from each data bit location.

Digital recording systems typically require a time reference which is conventionally recorded along with digital data. In the present embodiment the clocking pulses provide a time reference which is independent of any conventionally magnetically recorded data and which is permanent and cannot be inadvertently erased or destroyed.

DESCRIPTION OF THE PREFERRED EMBODIMENTS

Figure 1:
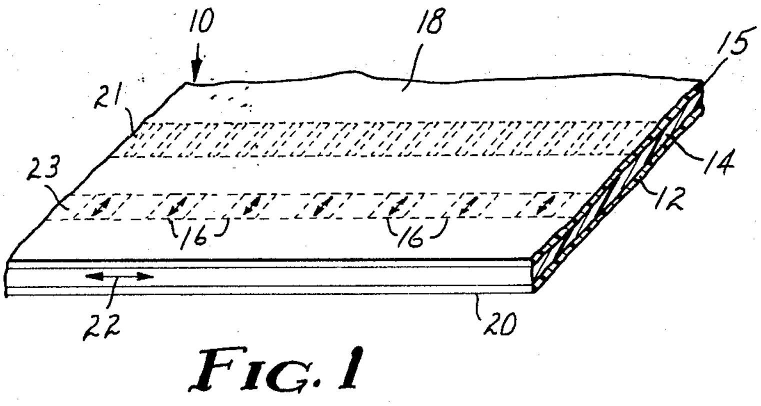
FIG. 1 is a three-dimensional view of a portion of a magnetic record medium according to the present invention having a magnetic recording layer containing a uniform dispersion of magnetizable material in which selected locations within the layer are physically aligned differently from the material in the remainder of the layer.

FIG. 1 shows a segment of a magnetic record medium 10 which comprises a thin sheet-like web backing 12 upon which is coated a magnetic recording layer 14 containing a uniformly dispersed magnetizable material having magnetic anisotropy. Such a materiai preferably consists of anisotropic particles of gamma-$Fe_2O_3$ such as are commonly used in magnetic recording media. An outer protective layer 15 may be affixed to the recording layer 14 as desired. By uniformly dispersed it is herein meant that the particle density, i.e., the number of particles per unit area, is approximately constant throughout the layer, even though the particles may be differently physically aligned at various locations. The magnetizable material is predominantly physically aligned parallel to a long dimension of the medium 20 along which the medium is intended to travel during use. Such a direction of physical alignment is shown by the double-headed arrow 22, and corresponds with the physical alignment of magnetizable particles in conventional magnetic recording media. The magnetizable material at a plurality of selected locations 16 is differently physically aligned with respect to the physical alignment of the particles in the remainder of the layer 14, and is preferably aligned in a direction transverse thereto to provide a series of spaced, magnetically detectable, permanent position/clocking marks, which are desirably used in conjunction with data such as may be magnetically recorded in the remainder of the medium 18 such as along a track 21.

Anisotropic particles such as gamma-$Fe_2O_3$ are readily magnetized in either direction parallel to their easy direction of magnetization. Thus, when such particles are physically aligned and are magnetized with a given applied field along the easy direction of magnetization, a higher level of remanent magnetization is retained than is retained should the applied magnetic field be along a direction other than the easy direction. The variations in the remanent magnetization may be sensed to detect the selected locations 16.

Figure 2:
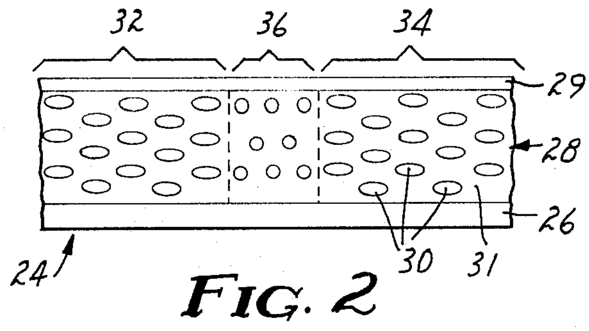
FIG. 2 is an enlarged cross-sectional view of a segment of the recording medium shown in FIG. 1.

FIG. 2 is an enlarged cross-section of a portion of another magnetic recording medium 24 comprising a thin sheet-like web backing 26 upon which is coated a magnetic recording layer 28 such as described above. An optional outer protective layer 29 may be affixed to the magnetic recording layer 28. The layer 28 contains acicular particles 30 of gamma-$Fe_2O_3$, which are uniformly dispersed within a flexible binder 31. The particles are shown further enlarged for graphic clarity. The layer 28 has background portions 32 and 34 within which the particles are uniformly physically aligned in one direction parallel to both the surface of the medium 24 and to the long dimension along which the document is intended to move. Portion 36 represents a selected location at which the particles 30 are further physically aligned, still parallel to the surface of the medium 24, but also normal to the physically aligned particles within the background portion 32 and 34. The delineation between the portions 32 and 34 and the selected location 36 is shown for clarity as an abrupt transition in the direction of alignment of physical the particles. Due to the normal divergence of the magnet flux, such a transition will generally extend over a distance dictated by the characteristics of the aligning magnetic field.

Methods for making such magnetic media are described and claimed in the above cross-referenced patent applications by the present inventors and by Richard E. Fayling and Douglas D. Campbell, the disclosures of which are incorporated herein by reference. The magnetic recording layers used in the magnetic recording media of the present invention may conveniently be a stripe of conventional magnetic recording media formed or affixed to a sheet-like web backing, such as a 1 mil. (0.025 mm.) polyethylene terephthalate sheet, and are typically formed of a mixture of the magnetizable material, a nonmagnetic flexible organic binder and a suitable solvent, which mixture is coated unto the web backing and subjected to appropriate magnetic fields to physically align the particles. In a typical case, such a coating comprises a uniform dispersion of 65wt. percent gamma-$Fe_2O_3$ acicular particles (typically 500 micrometers long and 100 micrometers diameter) and 35 wt. percent thermoplastic polyurethane binder together with a suitable solvent. The thickness of such a coating is typically controlled to be 0.004 inches (0.10 mm.). Other formulations, substrate and coating thicknesses may be similarly employed consistent with known magnetic recording media formulations.

Figure 3:
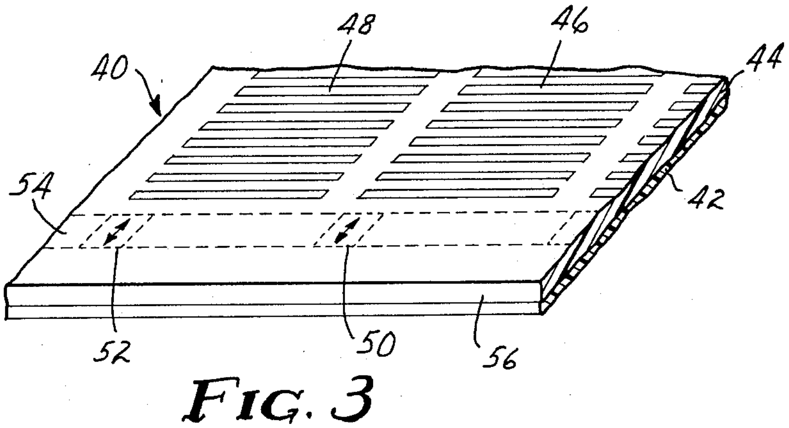
FIG. 3 is a three-dimensional view of a portion of a magnetic record medium according to the present invention having predetermined recording regions and having selected locations of differently physically aligned material corresponding to each of the predetermined regions.

FIG. 3 is a three-dimensional view of a portion of a magnetic record medium 40 of the present invention, which comprises a substrate 42 and a magnetic recording layer 44 containing uniformly dispersed magnetically anisotropic particles of gamma-$Fe_2O_3$. The layer 44 has data magnetically recorded at a plurality of predetermined recording regions 46 and 48. Such information is conveniently recorded along a number of tracks extending in the intended direction of movement of the medium, i.e., parallel to the long dimension 56 of the medium 40, within which tracks the particles are predominantly physically aligned parallel to the intended direction of movement. Associated with each recording region 46 and 48 is a selected location 50 and 52, positioned along a control track 54 extending in the intended direction movement of the medium. The magnetizable material within the selected locations 50 and 52 is physically aligned normal to the control track 54.

Figure 4:
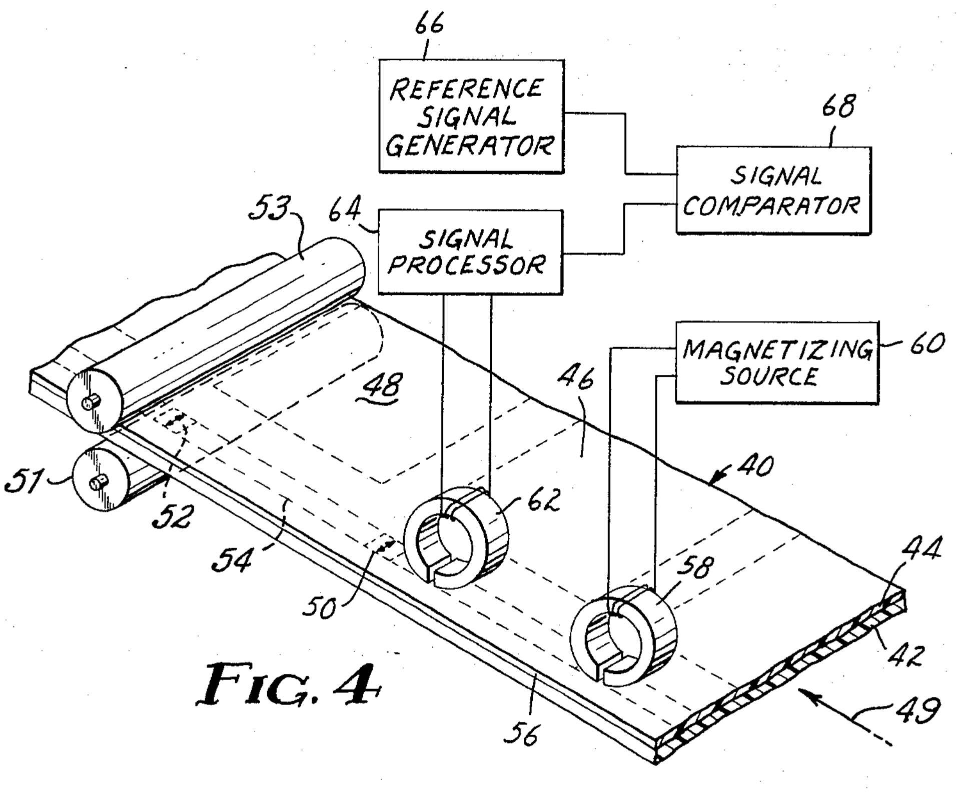
FIG. 4 is a combined three-dimensional and schematic view of an information processing system according to the present invention for locating predetermined portions of a magnetic record medium.

FIG. 4 shows an embodiment of the present invention for determining the location of the predetermined recording regions 46 and 48 of the record medium 40. In this embodiment, the magnetic record medium 40 described hereinabove is traversed in the direction indicated by the arrow 49 by a conventional capstan 51 and roller 53 coupled to a drive mechanism (not shown) parallel to the track 54. A magnetic field generating device 58, such as a conventional magnetic recording head, when energized by the magnetizing power source 60, produces a substantially unidirectional magnetic field having a major field component which is applied in the recording layer 44 parallel to the long dimension 56 along the track 54. Alternatively, the field generating device 58 may be an appropriately shaped and positioned permanent magnet. As the record medium passes the field generating device 58, all portions of the track 54 are subjected to a constant intensity magnetic field to differently magnetize the particles depending upon the physical alignment thereof along the track. This produces varying states of remanence in the particles such that as the record medium 40 thereafter passes adjacent the sensor device 62 the varying states of remanence are sensed to provide a signal representative of the selected locations 50, 52. The sensor device 62 is preferably a conventional magnetic recording playback head. However, Hall probes or other magnetic field sensors may likewise be used. The signal is then processed in a signal processor unit 64 which converts the sensed signals to a form compatible with standardized information processing formats. When the sensed signals are counted from a known location on the record medium 40 such as the beginning or leading edge thereof along the direction of travel, and are compared with a reference signal such as produced by a reference signal generator 66, the specific location of any given one of the selected locations may be determined. The two signals are readily compared by conventional electronic processing circuits such as contained within a signal comparator unit 68, which produces an output signal to be coupled to indicator devices, control mechanisms and the like.

Figure 5:
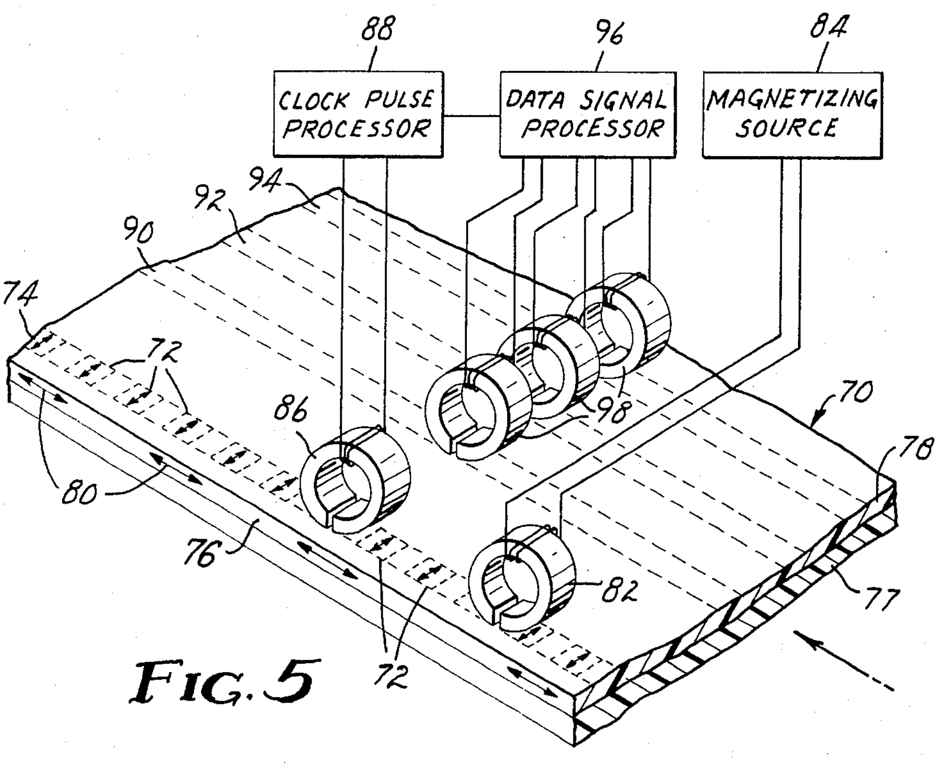
FIG. 5 is a combined three-dimensional and schematic view of an information processing system for providing clock pulses corresponding to locations whereat binary data may be magnetically recorded.

FIG. 5 shows an embodiment of the present invention for providng permanent clocking pulses associated with magnetically recorded data on a magnetic record medium such as described hereinabove. The magnetic record medium 70 contains selected locations 72 which are uniformly spaced along a track 74 extending in a direction parallel to an edge 76 of the record medium 70, which direction is also parallel to an intended direction of movement of the medium 70. As discussed hereinabove, the magnetic record medium 70 comprises a substrate 77 and a magnetic recording layer 78 within which magnetizable material is predominantly physically aligned parallel to the intended direction of movement such as shown by the double-headed arrows 80, and wherein the magnetizable material within the selected locations 72 is predominantly physically aligned normal to the intended direction of movement. When the medium 70 is moved at a uniform speed along a path parallel to the track 74, a magnetic field, produced by the magnetizing device 82 in response to energization by the magnetizing source 84, is applied in the recording layer 78 along the track 74, to cause the selected locations 72 to become differently magnetized from the remainder of the recording layer 78 along the track 74, in the same manner as described hereinabove. A magnetic sensor device 86, such as a conventional magnetic recording playback head is also positioned along the track 74 to sense the different magnetization and thereby generate a train of uniformly spaced signal pulses, which are subsequently processed and shaped in clock pulse processor unit 88. The magnetic record medium 70 also contains a number of recording tracks 90, 92, and 94, which extend parallel to the track 74, within which are a series of data bit locations, each location having a selected location 72 corresponding thereto. Each clock pulse thereby provides a signal indication, enabling recording and reproduction of a data bit from each data bit location by means of transducers 98. The clock pulses are converted in a clock pulse processor unit 88 into a series of uniformly spaced shaped clocking pulses which are transmitted to a data signal processor unit 96 which enables recording and reproduction of the data bits in the corresponding data bit locations.

What is claimed is:

1. In a magnetic recording medium comprising a backing and a layer thereon having a smooth outer surface, which layer comprises uniformly dispersed magnetizable material having magnetic anisotropy which magnetizable material is predominantly physically aligned parallel to an intended direction of movement, wherein the improvement comprises the magnetizable material at a plurality of selected locations spaced along a track extending in said intended direction of movement of the medium being physicaly aligned in a direction transverse thereto to provide a series of spaced magnetically detectable permanent position/-clocking marks.

2. A magnetic recording medium according to claim 1 wherein said layer comprises magnetizable particles uniformly dispersed in a nonmagnetic binder.

3. A magnetic recording medium according to claim 2, wherein the magnetizable particles are acicular gamma-$Fe_2O_3$.

4. A magnetic recording medium according to claim 2, wherein the predominant physical alignment in said one direction is parallel to the plane of the medium and the magnetizable particles within each of said selected locations are physically aligned parallel to the plane of the medium and perpendicular to said one direction.

5. In a magnetic recording medium comprising a backing and a layer thereon having a smooth outer surface, which layer comprises uniformly dispersed magnetizable material having magnetic anisotropy which magnetizable material is predominantly physically aligned parallel to an intended direction of movement, wherein the improvement comprises the magnetizable material at a plurality of selected locations uniformly spaced along a track extending in said intended direction of movement of the medium being physically aligned in a direction transverse thereto to provide a series of uniformly spaced magnetically detectable permanent position/clocking marks.

6. A magnetic recording medium according to claim 5 wherein the layer comprises magnetizable particles uniformly dispersed in a nonmagnetic binder.

7. A magnetic recording medium according to claim 6, wherein the magnetizable particles are acicular gamma-$Fe_2O_3$.

8. A magnetic recording medium according to claim 6, wherein the predominant physical alignment in said one direction is parallel to the plane of the medium and the magnetizable particles within each of said selected locations are physically aligned parallel to the plane of the medium and perpendicular to said one direction.

9. In a magnetic recording medium comprising a backing and a layer thereon having a smooth outer surface, which layer comprises uniformly dispersed magnetizable material having magnetic anisotropy, which magnetizable material is predominantly physically aligned parallel to an intended direction of movement, and wherein said layer has data magnetically recorded at a plurality of predetermined recording regions, wherein the improvement comprises the magnetizable material at a plurality of selected locations along a control track extending in said intended direction of movement of the medium and spatially correlated with the predetermined recording regions being differently physically aligned from the alignment of the magnetizable particles in the remainder of the layer to provide magnetically detectable permanent position marks for indicating the positions of the predetermined recording regions.

10. In a magnetic recording medium according to claim 9, wherein said predetermined recording regions are uniformly spaced along at least one recording track parallel to said one direction, said recording regions forming data bit locations for magnetically recorded binary data, wherein said selected locations are uniformly spaced along said control track to provide a series of uniformly spaced magnetically detectable permanent clocking marks corresponding to the series of data bit locations for providing signal indications for enabling reproduction of a data bit from each data bit location of said at least one recording track.

11. An information processing system for determining the location of predetermined portions of a record medium, which system comprises:

a magnetic recording medium comprising a backing and a layer thereon having a smooth outer surface, which layer comprises uniformly dispersed magnetizable material having magnetic anisotropy, which magnetizable material is predominantly physically aligned parallel to said intended direction of movement, and wherein the magnetizable material at a plurality of selected locations spaced along a track extending in said intended direction of movement of the medium is physically aligned in a direction transverse thereto to provide a series of spaced magnetically detectable permanent position/clocking marks;

means for moving said medium in said direction parallel to said track;

means for applying a substantially constant intensity unidirectional magnetic field along said track to differently magnetize said magnetizable material depending upon the direction of physical alignment thereof; and means for sensing the magnetization along said track when sid record medium is moved in a direction parallel to said track to produce signal pulses representative of said selected locations; and means for processing said representative signal pulses to locate predetermined portions of said record medium.

12. A system according to claim 11, wherein the magnetizable material within each of said selected locations is physically aligned parallel to the plane of the medium and perpendicular to said one direction, whereby the applied magnetic field magnetizes the magnetizable material other than at said selected locations along said track to a first remanent state and magnetizes the magnetizable material within the selected locations along said track to a second lower remanent state.

13. An information processing system according to claim 11, for providing clocking pulses, wherein said selected locations are uniformly spaced along said track to provide a series of uniformly spaced magnetically detectable permanent clocking marks corresponding to a series of data bit locations, and wherein said signal processing means comprises means coupled to said sensing means for converting said representative signal pulses into a series of uniformly spaced clocking pulses corresponding to the series of data bit locations to enable recording/reproduction of data bits in/from each said data bit location.

* * * * *